United States Patent

Mieras

[11] Patent Number: 5,602,984
[45] Date of Patent: Feb. 11, 1997

[54] LOW THRASH CACHE WITH SELECTABLE TILE GEOMETRY

[75] Inventor: Herbert J. Mieras, Thiensville, Wis.

[73] Assignee: Allen-Bradley Company, Inc., Milwaukee, Wis.

[21] Appl. No.: 284,879

[22] Filed: Aug. 2, 1994

Related U.S. Application Data

[63] Continuation-in-part of Ser. No. 752,416, Aug. 30, 1991, abandoned.

[51] Int. Cl.⁶ .................................................... G06F 12/08
[52] U.S. Cl. ........................ 395/501; 395/445; 395/340; 395/509; 395/515
[58] Field of Search ................................... 395/157, 162, 395/164, 445, 166; 345/185

[56] References Cited

U.S. PATENT DOCUMENTS

| | | | |
|---|---|---|---|
| 5,029,105 | 7/1991 | Coleman et al. | 395/166 |
| 5,046,190 | 9/1991 | Daniel et al. | 382/303 |
| 5,056,044 | 10/1991 | Frederickson et al. | 395/164 |
| 5,077,678 | 12/1991 | Guttag et al. | 395/157 |
| 5,146,592 | 9/1992 | Pfeiffer et al. | 395/157 |

FOREIGN PATENT DOCUMENTS 1262585 10/1989 Japan.
3015989 1/1991 Japan.

OTHER PUBLICATIONS

"Twenty-Five MHZ Logical Cache For A MC68020", *Motorola Memories*, Motorola, Inc, 1990, pp. 13-21 through 13-34.
"Designing A Cache For A Fast Processor", *Electronic Design*, Oct. 13, 1988, vol. 36, No. 23.

*Primary Examiner*—Tod R. Swann
*Assistant Examiner*—J. Peikari
*Attorney, Agent, or Firm*—Quarles & Brady

[57] ABSTRACT

A cache memory stores data from a source. Each item of data is identified by an address having a plurality of bits divided into four groups. A multiplexer responds to a control signal by selectively applying two of the groups of bits to address inputs of a tag memory and a random access memory, and selectively applying the other two groups of bits to a data input of said tag memory. The multiplexer enables different groups of address bits to address the two memories. A comparator compares a first set of bits formed by the other two groups of address bits to a second set of bits read from said tag memory. A memory controller causes data to be read from the random access memory when the first and second sets of bits match. When the first and second sets of bits do not match, the memory controller causes data to be read from the source and stored in the random access memory. In the latter instance, the tag memory stores the bits present at its data input.

6 Claims, 4 Drawing Sheets

LOW THRASH CACHE WITH SELECTABLE TILE GEOMETRY

This application is a continuation-in-part of application of Ser. No. 07/752,416 filed Aug. 30, 1991, now abandoned.

BACKGROUND OF THE INVENTION

The present invention relates to cache memories, and particularly to the use of cache memories to store data in an image processing system.

Data processing apparatus commonly store data and program instructions in a memory device. The memory may be any of several forms, such as solid state circuits, floppy diskettes or hard disks. The amount of time required to retrieve information from a memory varies depending upon the type of memory device and how many other components are competing for access to the memory. The physical relationship of the storage location of newly sought data to that for the last item of data acquired from the memory also can affect the retrieval time.

At times, the speed at which a program executes is in large part a function of how long it takes the central processing unit (CPU) to obtain data and program instructions from the memory. Programs often include one or more subroutines, or groups of instructions that are executed frequently. In other cases, the program may repeatedly use specific items of data. Thus it is desirable to store frequently used instructions and data in a manner that minimizes the time required for the central processing unit to obtain them.

A common technique to provide faster access to frequently used information uses a "cache memory". Typically, the CPU is the only device that may access the cache memory and is connected to the memory in a manner that facilitates access. When the central processing unit executes a new task, the first instruction or data item is fetched from the main memory medium. Other instructions or data in adjacent main storage locations may also be fetched at that time. The fetched instructions or data are placed in a first random access memory device of the cache memory. The cache memory has a second random access memory device which stores a "tag" that indicates whether information from a given address of the main memory is present in the cache.

Thereafter each time the central processing unit needs an item of data or a new instruction, the corresponding address for the main memory is applied to the cache memory. The address is used to read a tag from the second memory device and the tag is inspected to determine whether the requested information is present in the cache. If that information is present, the first random access memory device is enabled to send the item to the central processing unit. If the requested information is not contained in the cache, the address is sent to the main memory to obtain the information item. Once the new item has been obtained it is placed in the cache memory, as well as being sent to the central processing unit.

SUMMARY OF THE INVENTION

A cache memory stores data from a source in which each item of data is identified by an address having a plurality of bits. The cache memory includes a tag memory circuit and a data memory circuit that both have an address input port along with a data input and output. When an item of data is required by a utilization device, the cache memory receives the address of that data, then divides the address bits into at least two groups.

A multiplexer selectively connects one of the groups of address bits to the address input ports of the two memory circuits and selectively connects the other group to the data input of the tag memory circuit. The selection of the two groups is reversible. In one embodiment of the present invention, the address bits are divided into four groups and the multiplexer selectively couples two of the groups to the address input ports of the two memory circuits and selectively connects the other two bit groups to the data input of the tag memory circuit. The selection of the different groups is made in response to a control signal.

A comparator receives the other group of address bits and a like number of bits read from the tag memory circuit in response to being addressed by the one group. The two sets of bits are compared to each other and the comparator produces a signal indicating whether the two sets of bits are identical. A controller responds to the signal from the comparator by reading data from the data memory circuit when the signal indicates a match between bits, or by obtaining data from the source when the sets of bits do not match. The data obtained by the controller is made available to the utilization device.

When the signal indicates that the compared sets of bits do not match in the preferred embodiment, the data obtained from the source also is stored in the data memory circuit. When this occurs, the other group of address bits is stored in the tag memory circuit at a location addressed by the one group of address bits.

A general object of the present invention is to provide a cache memory in which the bits of the address that are selected as a cache memory address and as the cache memory data can be changed in response to a control signal.

An object of the present invention is to provide a cache memory for an image processing system that hold a portion of the image data being processed.

Another object is to provide such a cache memory which can be configured to store different geometrically shaped portions of the image.

DESCRIPTION OF THE PRESENT INVENTION

Figure 1:
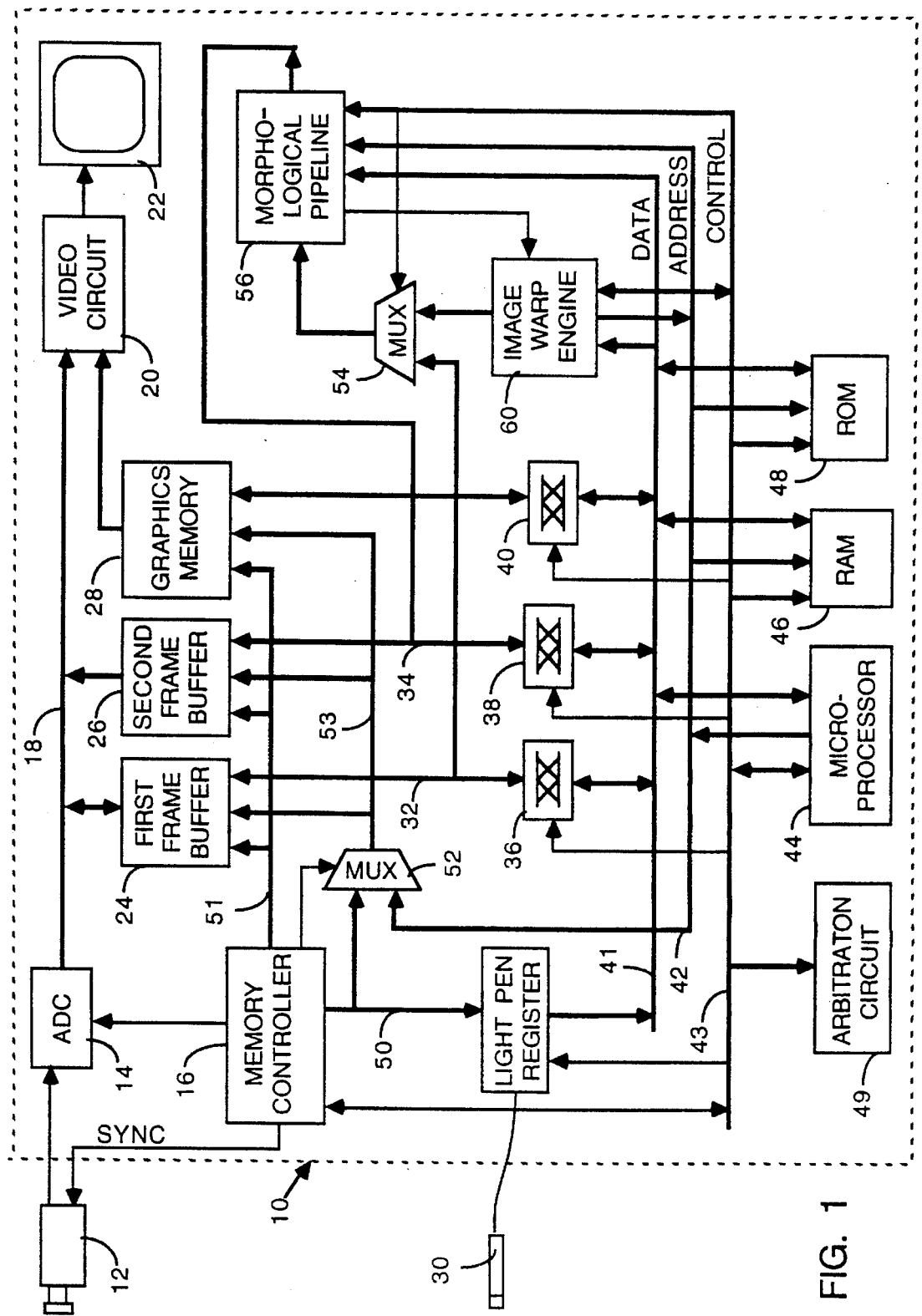
FIG. 1 is a block diagram of a video image processing system incorporating the present invention.

With reference to FIG. 1, a video image processing system 10 receives an image signal from a conventional raster scan video camera 12 that provides image data on a row by row basis. The camera signal is coupled an analog-to-digital converter (ADC) 14, which converts the signal into a series of digital picture elements (pixels) with the gray scale luminance of each pixel represented by a multiple bit digital number. The analog-to-digital converter 14 is clocked by a signal from a memory controller 16 to produce 512 pixels for each of 512 horizontal scan rows from the camera, for example. The memory controller 16 also provides a horizontal and vertical synchronization (sync) signal to the camera 12.

The multiple bit pixels from the analog-to-digital converter 14 are coupled to a parallel video bus 18. Two dual-ported random access memories (RAM) have ports connected to the video bus 18 and act as frame buffers 24 and 26 to hold image data. Each of the frame buffers 24 and 26 has a sufficient number of memory locations to store a video image frame in the form of an array of 512 by 512 pixels. A video signal generator circuit 20 is connected to the parallel video bus 18 and converts the series of digital pixels received from the bus into a conventional analog video signal for displaying an image on monitor 22.

A graphics memory 28, which also is a dual ported RAM, has one port coupled to the video signal generator circuit 20. The graphics memory 60 stores a video image comprising alpha-numeric characters and graphic symbols for display on the monitor 22. These characters and symbols are used to set-up the processing system 10 for image analysis and to display the results of the analysis. For example, icons are displayed on the monitor 22 providing a menu of functions for an operator to select using a light pen 30. The video signal generator circuit 20 superimposes the image from the graphics memory 60 over an image from the camera 12 or a frame buffer.

The read and write operations of the frame buffers 24–26 and the graphics memory 28 are governed in part by the memory controller 16. Memory access control signals are applied by this controller 16 to the memory devices via lines 51. During image acquisition and display operations, the memory controller 16 generates addresses that are sent in parallel via lines 50 through a two-to-one address multiplexer 52 to a common parallel video address bus 53. The address inputs of the frame buffers 24 and 26 and of the graphics memory 28 are connected to the video address bus 53. Each pixel stored in these memory devices is addressed by a digital number, which has a group of bits that specifies a horizontal row of the image array in which the pixel is located and another group of bits which specifies an vertical column of the image array.

Another data port of each of the dual ported frame buffers 24 and 26 is coupled to a separate memory data bus 32 or 34, respectively. The memory data buses 32 and 34 are connected through separate sets of tri-state data buffers 36 and 38 to a parallel shared data bus 41. A second data port of the graphics memory 28 is coupled by another set of tri-state buffers 40 to the shared data bus 41. Each of these tri-state buffers 36–40 is individually enabled by signals from a shared control bus 43. The system 10 also includes a shared address bus 42, that is connected to another set of inputs of the address multiplexer 52.

A microprocessor 44 is coupled to the three shared buses 41–43 and executes a program which controls the operation of the processing system 10 to acquire and analyze video images received from camera 12. The program for the microprocessor 44 is stored in a read only memory (ROM) 48 which also is coupled to the three shared buses 41–43. A random access memory (RAM) 46 provides storage locations for data used by the microprocessor 44 during the execution of the program and for the results of the image analysis. An arbitration circuit 49 controls access to the shared buses 41–43 in a conventional manner.

When image data from the camera 12 is to be acquired, the memory controller 16 sends control signals to place the first frame buffer 24 in a mode for storing data received through the port connected to the video bus 18. The image data is clocked from the camera 12 through the ADC 14 and into frame buffer 24. During the image acquisition process the address multiplexer 52 selects the address signal on lines 50 from the memory controller 16 to apply to the first frame buffer 24. As the image data is clocked through the ADC 14, the addresses are incremented to store the pixels. The memory controller 16 accesses the frame buffers 24–26 and the graphics memory 28 in a similar manner to read image data for display on monitor 22. In this mode the image data is sent from the first port of a selected frame buffer 24 or 26 over the video bus 18 to the video signal generator circuit 20.

At other times, the microprocessor 44 generates addresses to read the image data for processing. When this occurs, the memory controller 16 instructs the address multiplexer 52 to couple shared address bus 42 to the frame buffers 24 and 26. The data is read from the second port of the selected frame buffer onto the associated memory data bus 32 or 34. The microprocessor 44 either processes the image data or instructs an pipeline input multiplexer 54 to connect the memory data bus 32 from the first frame buffer 24 to the input of a morphological image processing pipeline 56.

The morphological image processing pipeline 56 is similar to the one described in U.S. Pat. No. 5,046,190 entitled "Pipeline Image Processor", which is incorporated by reference herein. The pipeline 56 receives data from the microprocessor 44 which defines the transformation that is to be performed on the image. A morphological transformation involves altering each pixel based on its numerical value and the values of neighboring pixels. As each pixel of the transformed image is available at the output of the pipeline 56, the second frame buffer 26 is enabled to store that pixel. After the transformation is complete, the transformed image can be read by the microprocessor 44 from the second frame buffer 26 for further analysis, or display on monitor 22.

Alternatively the image pixels in the first frame buffer 24 are read by an image warp engine 60, which geometrically rearranges the original image before sending it to the morphological pipeline 56. The warp engine 60 performs the rearrangement of the image by reading pixels from the first frame buffer 24 in other than the raster scan order in which they were stored. For example, the image can be rotated ninety degrees by reading the pixels column by column from the array instead of row by row. At other times, a two dimension linear translation of the image can be performed to justify an object in the image to a datum position before analysis. The warp engine 60 acquires pixels from the first frame buffer 24 via data buffer 36 and the shared data bus 25, and supplies them to the morphological pipeline 56 via input multiplexer 54.

The warp engine 60 has a direct mapped cache memory which supplies pixels to the morphological pipeline 56 more rapidly than by reading the pixels from the frame buffer 24 each time a pixel is needed. As noted previously the pipeline transforms each pixel based on the values of neighboring pixels. Therefore the processing must repeatedly access a given pixel not only for its transformation, but also for the transformation of its neighbors. Although the pixels can be read rapidly from the frame buffers in the raster scan order in which they were stored, the reading process slows down when other readout orders are used, such as column by column. In addition the frame buffers are designed to readily read several pixels on the same row at a time. However since the pipeline 56 can receive only one pixel at a time, it cannot take advantage of the simultaneous multiple pixel readout capability. The warp engine 60 can acquire the pixels in groups store them in the small cache memory from which individual pixels can be accessed more rapidly than from the frame buffers. Thus the warp engine still may be used to supply pixels to the morphological pipeline 56 even though the image is not being geometrically rearranged. The operation of the warp engine 60 will be described in detail subsequently.

In order to understand the design and operation of the warp engine 60, an description of how the pixels in the frame buffers are addressed will be beneficial. Each pixel address is twenty bits long, for example. Although only eighteen bits are required to address each pixel in a 512 by 512 pixel image, the additional address bits designate which of the frame buffers or graphics memory contains the desired pixel. The least significant ten bits of the address specify a location horizontally in the image, i.e. a column of the image array, and are referred to herein as the X coordinate. The most significant ten bits of the address specify a location vertically in the image, i.e. a row of the array, and are referred to herein as the Y coordinate. The cache memory has a number of storage locations which is a fraction of the number of locations in the frame buffers 24 and 26. Thus the cache memory stores a subarray of the pixels for an image contained in a given frame buffer. A novel feature of the present cache memory is the ability to define the dimensions of the subarray and thereby the shape of the portion of the image stored therein. Although to simplify the following description, the cache memory is being described as though each of its storage locations holds a single pixel, each location typically would hold all the 32 pixels read at a time from a frame buffer.

The image is stored in each frame buffer 24 and 26 as a square, two dimensional array in which the number of pixels in each row equals the number of rows, e.g. 512. However, this geometric relationship is not a absolute requirement in order to practice the present invention. In the embodiment shown in the drawings, the cache memory can be configured to store full rows of pixels, full columns of pixels or a square subarray of pixels. The subarray of any of these shapes can be considered as a rectangular storage area that is shifted through the image to store different groups of pixels which fall within its boundary. For example, a horizontally configured cache memory can be "shifted" downward in the image data by replacing presently stored pixels from one row with the pixels for the next row. The cache memory can be moved upward in a similar manner. As will be described, the pixels in this configuration of the cache memory are not necessarily replaced a full row at a time, but on a pixel by pixel basis as each pixel from a new row is required.

Figure 2:
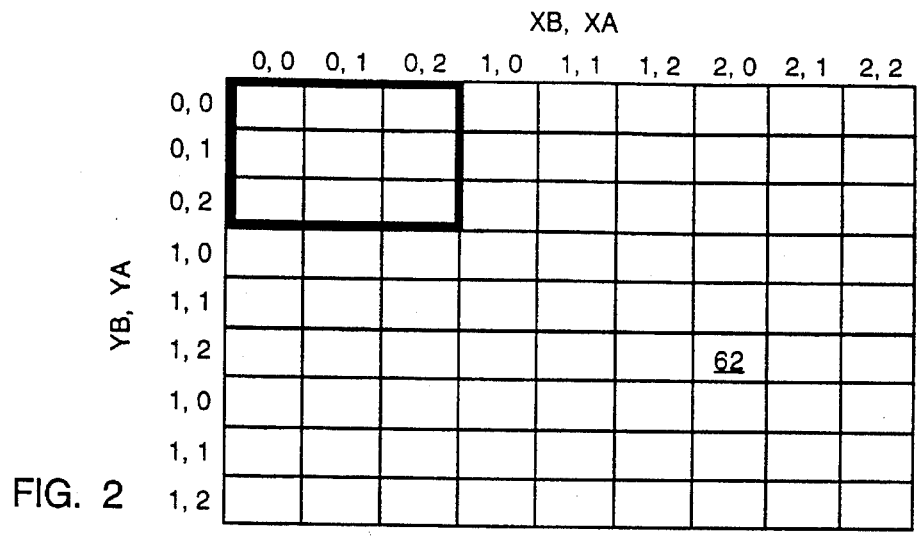
FIG. 2 depicts one configuration of a cache memory to store a portions of the image having a first geometrical shape.

To simplify the explanation of the operation of the cache memory, consider the nine by nine pixel image shown in FIG. 2 instead of a full 512 by 512 pixel image. Assume that the cache memory has nine storage locations and is configured for a three by three pixel subarray as indicated by the stippled square in the upper left corner of the image. This subarray can be positioned in three non-overlapping positions horizontally across the image. Thus the X coordinate portion of the pixel address can be subdivided into two segments of bits designated XA and XB with the XA segment identifying the horizontal position of the pixel within the cache memory and the XB segment specifying the non-overlapping horizontal subarray position. Similarly the Y pixel coordinate portion of the pixel address can be subdivided into two segments of bits designated YA and YB. As a result, the twenty bit pixel address is broken down into four segments of bits XA, XB, YA and YB. For example the pixel designated 62 in the exemplary image has values for the segments XA, XB, YA and YB of 0, 2, 2 and 1 respectively. Thus, XA are the least significant bits of X and YA are the least significant bits of Y. The usage of this segmentation of the address will become apparent in the course of describing the warp engine 60.

Figure 3:
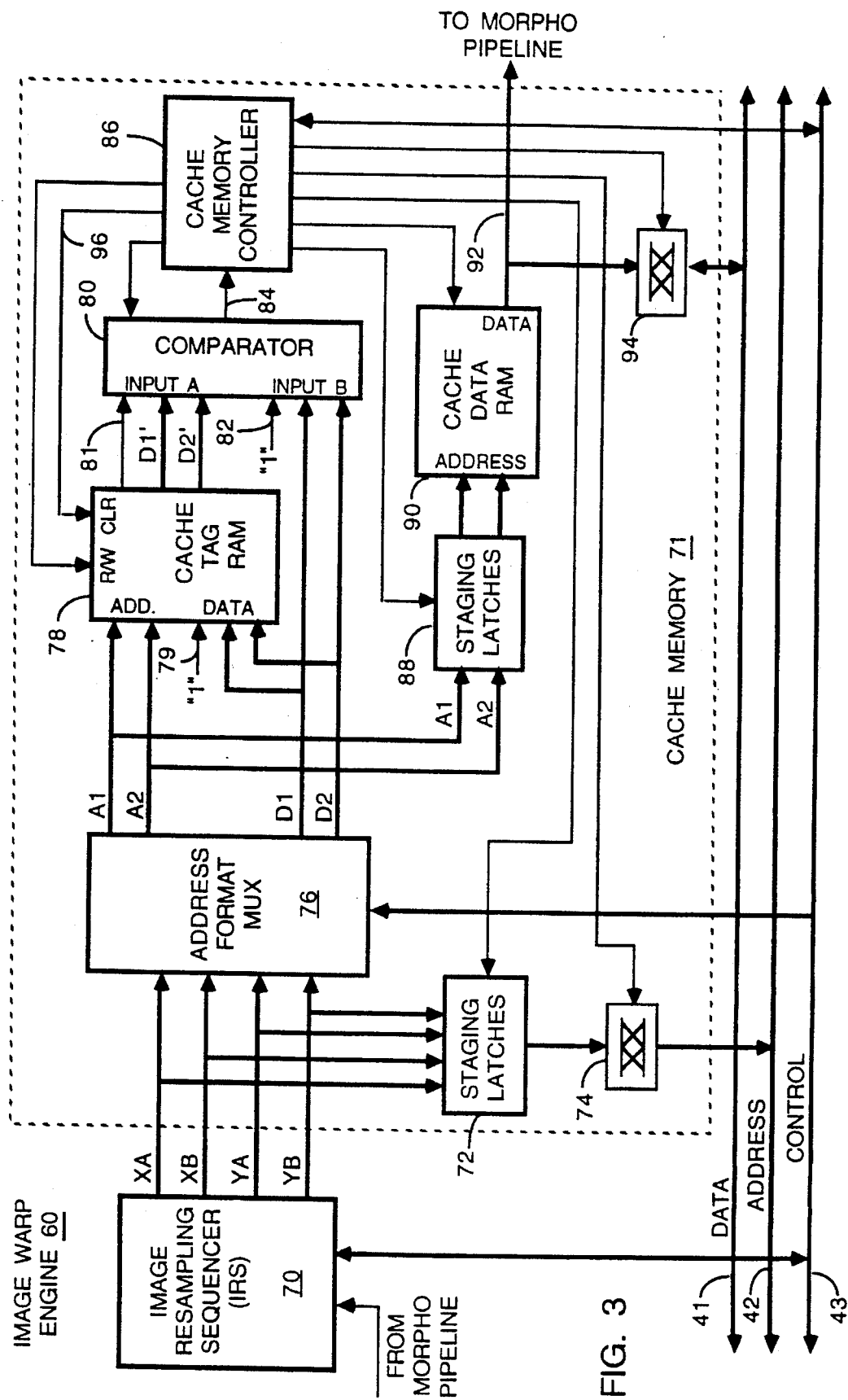
FIG. 3 is a block diagram of the cache memory circuitry.

The details of the warp engine 60 are shown in FIG. 3. The heart of the engine is an image resampling sequencer (IRS) 70, such as a model TMC2302 device manufactured by Raytheon Semiconductor Corp. The IRS receives instructions from the microprocessor 44 which configures the IRS to geometrically alter the image, for example, rotate the image ninety degrees. To do so, the IRS 70 generates addresses to read pixels from the stored image on a column by column basis, i.e. sequentially reading the pixels in one column, then in the next column, and so on. Since the pixels of the image were stored on a row by row basis, the column by column readout has the effect of rotating the image ninety degrees. Whether the pixels are read from top to bottom or bottom to top and whether the left-most or right-most column is read first determines the direction of the rotation. The geometry of the image can be altered in other forms as will be apparent to one skilled in the use of IRS devices, such as persons who use special effects television equipment.

Each address is passed from the IRS 70 to a cache memory 71 denoted in FIG. 3 by the dashed lines. Specifically, four sets of lines, carrying the address segments XA, XB, YA and YB are connected to a first set of staging latches 72 which delay the application of a given address to a set of address buffers 74. The four address segments XA, XB, YA and YB are combined into a single parallel bus at the output of the staging latches 72. The address buffers 74 selectively couple the delayed pixel address to the shared address bus 42.

The address from the IRS 70 is also passed to the input of an address format multiplexer 76. This multiplexer 76 is configured by control signals from the microprocessor 44 to connect the four input lines for the address segments XA, XB, YA and YB to output lines A1, A2, D1 and D2. The pattern of the connection depends upon the geometric configuration of the cache memory 71. The configuration is performed in the setup mode by the user employing light pen 30 to select appropriate icons displayed on monitor 22, as described in U.S. Pat. No. 4,916,640. For the square cache memory configuration shown in FIG. 2, the address format multiplexer 76 applies address segment XA to output lines A1, segment YA to output lines A2, segment XB to output lines D1 and segment YB to output lines D2. The bits on lines A1 and A2 comprise the address for the cache memory 71 and the bits on lines D1 and D2 form what is commonly referred to as a "cache tag" or "cache tag data."

The cache address lines A1 and A2 and the cache data lines D1 and D2 are connected respectively to the address port and data port of a cache tag RAM 78. The multiple bit address lines A1 and A2 carry a signal that selects the storage location to be accessed in the cache tag RAM 78. If this RAM 78 is in the write mode the data present on the multiple bit data lines D1 and D2 are stored in the RAM along with a high logic level bit on data input line 79. In the read mode, the contents of the addressed storage location are sent in parallel from the cache tag RAM 78 through a data port to two sets of output bit lines designated D1' and D2' and a single bit line 81. The cache tag RAM 78 can be a dual ported device or a tri-state buffer can be used to isolate the single data port of the RAM from the D1 and D2 output lines of the address format multiplexer 76 except when data is to be stored.

The contents of the cache tag RAM 78 are fed to one set of inputs of a multiple bit comparator 80 which has another set of inputs coupled to the data lines D1 and D2 and to a constant high logic level on line 82. The comparator 80 determines whether the bit patterns at the two sets of inputs are identical and provides an indication of that determination on an output line 84. This determination is sent to a cache memory controller 86 which governs the operation of the cache memory 71, as will be described. The cache memory controller 86 is connected by a series of control lines to many of the components in the cache memory 71, as can be seen on FIG. 3.

The cache address lines A1 and A2 also are connected to a second set of staging latches 88 which provide a delay between when the address is generated by the IRS 70 and the time that it reaches the address inputs of a cache data RAM 90. This delay accounts for the processing time required before an indication is provided by the comparator whether the desired pixel is present in the data RAM 90 of the cache memory 71. When the desired pixel is present, it is read from the cache data RAM 90 and supplied via output lines 92 and multiplexer 54 to the morphological pipeline 56. The data port of the cache data RAM 90 also can be connected to the shared data bus 41 through a set of data buffers 94, in response to a control signal from the cache memory controller 86.

Because the cache memory 71 stores only a portion of the image data stored in the first frame buffer 24, a mechanism is required to determine whether a given pixel sought by the IRS 70 is stored in the data RAM 90. That is the function of the cache tag system. Considering the configuration of the cache memory depicted in FIG. 2, as the image resampling sequencer (IRS) 70 generates an address, the address format multiplexer 76 applies the bits in address segment XA to output lines A1, segment YA to output lines A2, segment XB to output lines D1 and segment YB to output lines D2. This connection pattern is defined by data that the address format multiplexer 76 has previously received and stored from the microprocessor 44 in response to the setup process. The address format multiplexer 76 selects which groups of pixel address bits will be used as cache addresses and which will be used as cache data. The multiple bits on cache address lines A1 and A2 access a specific location in the cache tag RAM 78 that contains data identifying whether the desired pixel is stored in the cache data RAM 90.

When a new image is acquired and stored in the first frame buffer 24, the cache tag memory 78 is cleared by the cache memory controller 86 issuing a clear signal over line 96. The cache tag memory responds to this signal by storing zeroes in all its storage locations. When the IRS 70 generates a pixel address for the first time thereafter, all zeroes will be read from the cache tag memory 78 on lines 81, D1' and D2'. The comparator 80 initially responds to a comparison enable signal from the cache memory controller 86 by comparing a logic level on line 81 to the constant high logic level on line 82. A high logic level on both these lines indicates that tag data has been previously stored in the addressed location of the cache tag RAM 78. At the present time in the example, the logic levels are not equal as line 81 has a low, or zero level which indicates the tag storage location has been cleared and that the desired pixel is not present in the cache data RAM 90.

With reference to FIGS. 1 and 3, the cache memory controller 86 responds to this indication by instructing the cache tag RAM 78 to write the bits on data lines 79, D1 and D2 into the addressed location. At this time, the cache memory controller also requests the arbitration circuit 49 for access to the set of shared buses 41–43. When that access is granted, the address of the desired pixel is applied by the address buffer 74 from the staging latches 72 where it had been stored to the shared address bus 42. The address multiplexer 52 is commanded to connect the shared address bus 42 to the video address bus 53. The data buffer 36 for the first frame buffer 24 also is instructed to connect the its memory data bus 32 to the shared data bus 41. Once this connection is complete, the desired pixel is retrieved from the first frame buffer 24 and fed to the image warp engine 60.

The retrieved pixel is passed through cache data buffer 94 from which it is applied simultaneously to the cache data RAM 90 and the morphological image processor pipeline 56 via multiplexer 54. Then the cache data RAM 90 is commanded by the cache memory controller 86 to store the retrieved pixel in the location designated by the address segments A1 and A2. This completes the process with respect to the first address from the IRS 70.

Eventually the IRS 70 again will seek one of the pixels previously stored in the cache memory 71. When this occurs, the address format multiplexer 76 segments the address from the IRS onto lines A1, A2, D1 and D2 as previously described. The bits on cache address lines A1 and A2 access the appropriate storage location in the cache tag RAM 78 from which data is read onto lines 81, D1 and D2. This time the bit on line 81 will have a high logic level due to the previous storage of the bit from line 79 into the addressed location. Thus when the comparator 80 looks at the bits on lines 81 and 82 both bits will have high logic levels. This match causes the comparator to continue by comparing the bits on lines D1 with those on lines D1' and comparing the bits on lines D2 with those on lines D2'. A match of all these bits indicates that the desired pixel is stored within the cache memory 71.

The occurrence of a complete data match is signalled by the comparator 80 to the cache memory controller 86. The controller responds by instructing the cache data RAM 90 to read the pixel stored at the address specified by address segments A1 and A2. The full comparison process takes several clock cycles during which time the IRS 70 is generating other pixel addresses. Therefore the staging latches 88 provide a delay so that the corresponding address segments will be available for the inputs of the cache data RAM 90 at the completion of the comparison. These segments will be replaced in the staging latches when another pair is produced at the output of the address multiplexer 76.

If the desired pixel is not stored in the cache data RAM 90, the comparator 80 will not find a match of the data on lines D1 and D2 with that on lines D1' and D2'. When this occurs the image warp engine 60 must acquire the desired pixel from the first frame buffer 24 in a manner similar to that described above when a new image is being accessed. At the completion of the full comparison process the address currently being generated by the IRS 70 is not the same address which created the mismatch. In fact several addresses were generated during the time required for the comparison. However, these addresses are all stored in the first set of staging latches 72. The cache memory controller 86 responds to the mismatch indication by selecting the corresponding address from the first set of staging latches 72 to apply to the shared address bus 42 in order to obtain the desired pixel from the first frame buffer 24. When this new pixel is received by the cache memory 71, it is written into the appropriate location of the cache data RAM 90, replacing any previous pixel at that location. At the same time, the corresponding location in the cache tag RAM 78 is updated with new data on line D1 and D2 for the new pixel. It should also be noted that each new address produced by the IRS 70 replaces the oldest address in staging latches 72.

Figure 4:
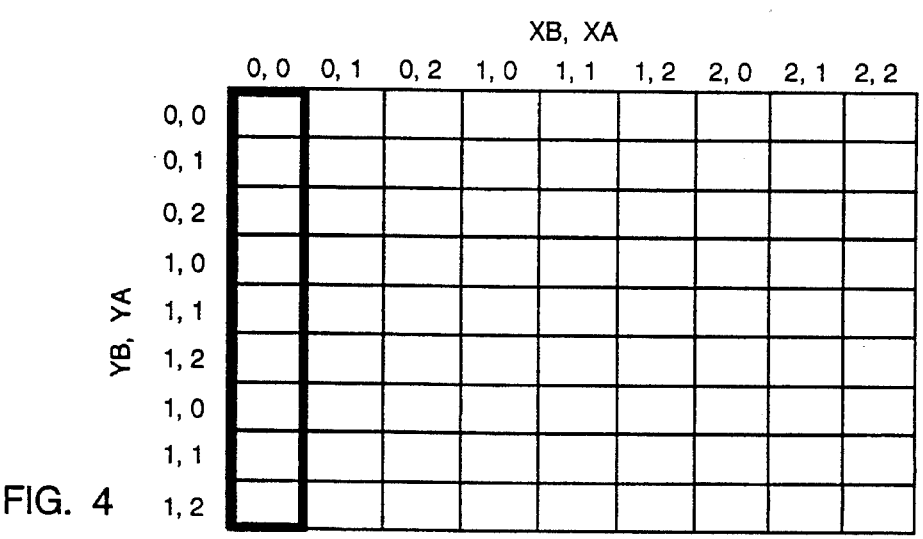
FIG. 4 and FIG. 5 depict other configurations of the cache memory to store portions of the image having a different geometrical shapes.

A key feature of the present cache memory 71 is the ability to configure the geometry of the area of storage for the subarray of pixels in the image. FIG. 4 illustrates how a the cache memory 71 with nine storage locations can be set up to store a column of pixels, instead of the three by three square array in FIG. 2. To configure the cache memory in this manner, the microprocessor 44 sends control signals to the address format multiplexer 76 which cause the latter device to make the following connections: input YA to output A1, input YB to output A2, input XA to output D1 and input XB to output D2. In this configuration the YA and YB pixel address segments select the cache memory storage location and the XA and XB pixel address segments determine the position of the columnar subarray across the image. That is segments YA and YB form the cache address and segments XA and XB make up the cache tag data. The processing of addresses by the cache memory 71 is the same as that previously described for the square subarray.

Figure 5:
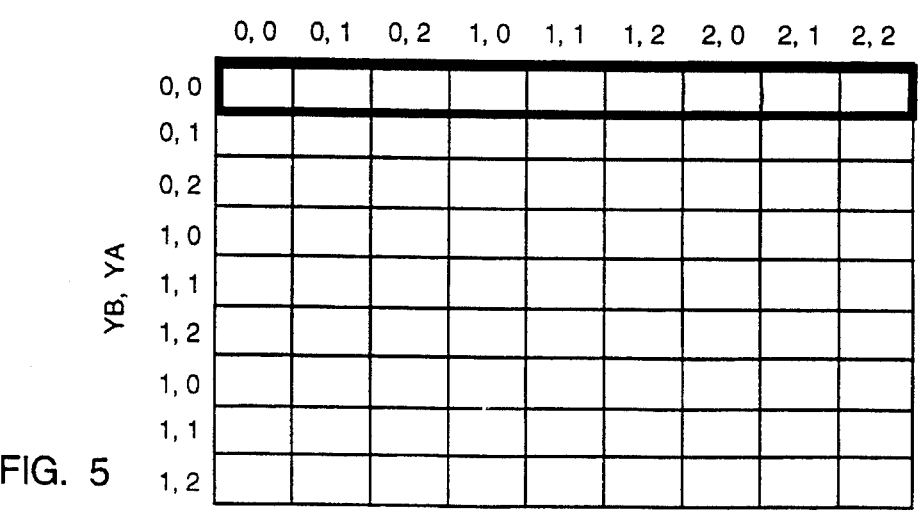

Alternatively, the cache memory 71 can be configured to store a full horizontal row of the image as illustrated in FIG. 5. In this case, the address format multiplexer 76 is instructed to make the following connections: input XA to output A1, input XB to output A2, input YA to output D1 and input YB to output D2. In this configuration the pixel address segments XA and XB groups of pixel address bits select the cache memory storage location and segments YA and YB determine the position of the horizontal subarray vertically through the image. That is segments XA and XB form the cache address and segments YA and YB make up the cache tag data.

As noted previously, FIGS. 2, 4 and 5 represent a simplified image and cache memory setup. In practice the cache memory 71 stores several columns or rows instead of only one as shown in FIGS. 4 and 5. Other geometric shapes may also be defined for the cache memory subarray by a more complex connection of specific bits of the pixel address to sets of lines A1, A2, D1 and D2.

The present invention not only provides a cache memory where the subarray of the cache may be configured to a variety of different shapes, ("shape" referring to the outline of the cache data in the image), but allows that cache shape to be positioned anywhere over the image, that is, allows the cache to receive data from the image without regard to fixed tile boundaries.

Figure 6:
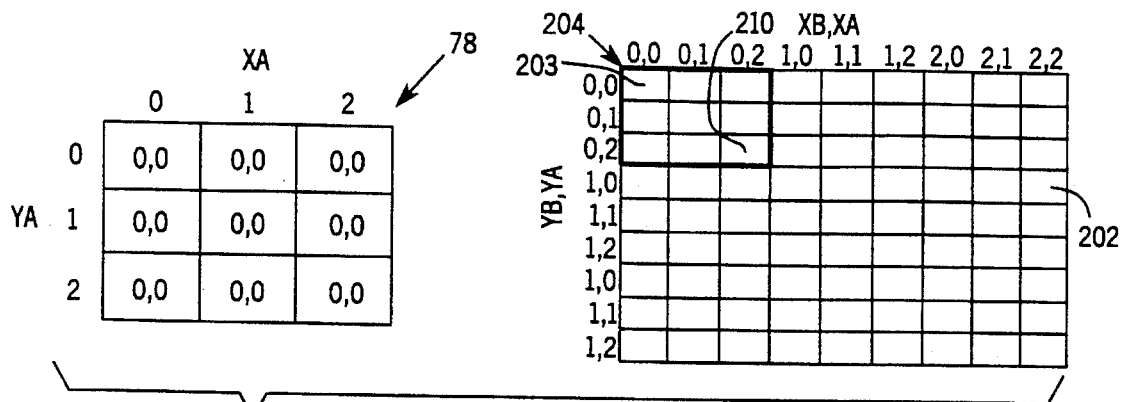
FIG. 6, FIG. 7 and FIG. 8, are figures similar to FIGS. 4 and 5 depicting configurations of the cache memory overlaid on the image and showing the contents of the tag memory for the cache memories of those shapes and illustrating the ability of the cache memory of the present invention not only to conform to different geometrical shapes or tiles but to smoothly cross tile boundaries to reduce thrashing.

Referring now to FIG. 6, the image array previously shown in FIG. 2 has a variety of pixels 202 as have been previously described. Certain of the values of these pixels 202 may be stored in a cache memory (not shown in FIG. 6) in nine locations arrayed in a 3×3 tile.

In the present example, the subarray 204 is positioned in the upper left hand corner of the image. The tag memory 78 records the filling of the cache with the values of the pixels 202 of the subarray 204 in the following manner. As has been described, the least significant bits of each pixel 202 form the address of the tag memory and the most significant bits of each pixel are placed as contents in the tag memory. Thus, pixel 203 (0,0) (0,0) being in the upper left hand corner and having the values of XA=0, XB=0, YA=0 and YB=0 is stored in tag memory address 0,0 (based on the least significant bits of the pixel address being 0,0) and the contents of that tag memory location are also loaded with the 0,0 indicating the most significant bits of the stored pixel 203 and generally indicating that the stored pixel 203 is in the block defined by the most significant bits 0,0. Similarly, pixel 210 having address (0,2) (0,2) where XA=2, XB=0, YA=2 and YB=0 is stored in location 2,2 in the tag memory 78 defined by its least significant bits of its address and that contents holds the value 0,0 being the most significant bits of the pixel 210.

Here, all the pixels of the subarray are within one tile not crossing any tile boundaries 214 i.e., each of the locations of the tag memory have an identical value of their most significant bits.

Figure 7:
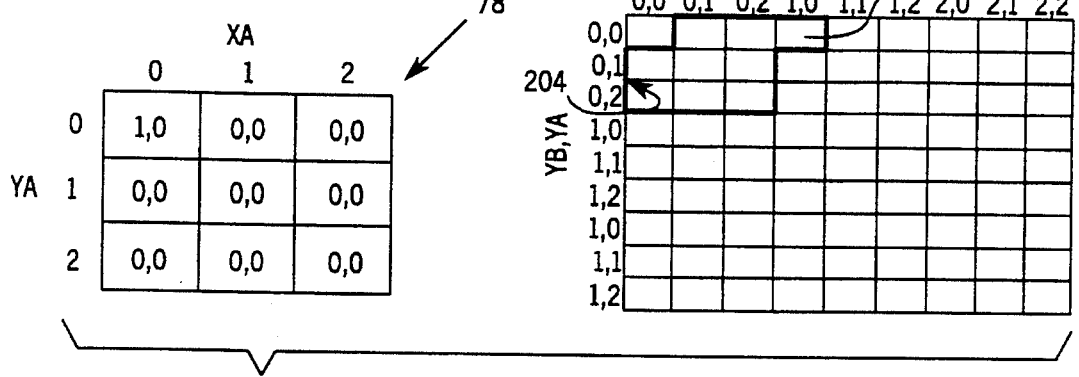

This need not be the case however. Referring to FIG. 7, as has been previously described with respect to the staging latches 72, one pixel 212 in the cache may cross the tile boundary 214 thus giving the subarray 204 a nonrectangular shape. Here the tag memory now reflects the fact that the pixel at tag address 0,0 is no longer within the tile 0,0 but is within the next tile over defined as 0,1. This change in the tag memory reflects the fact that the address format multiplexer 76 of FIG. 3 of the present invention does not discard address data for the pixels stored in the cache but implicitly saves all address data of the pixels stored in the cache either as the address space of the tag memory or a data in the tag memory.

Figure 8:
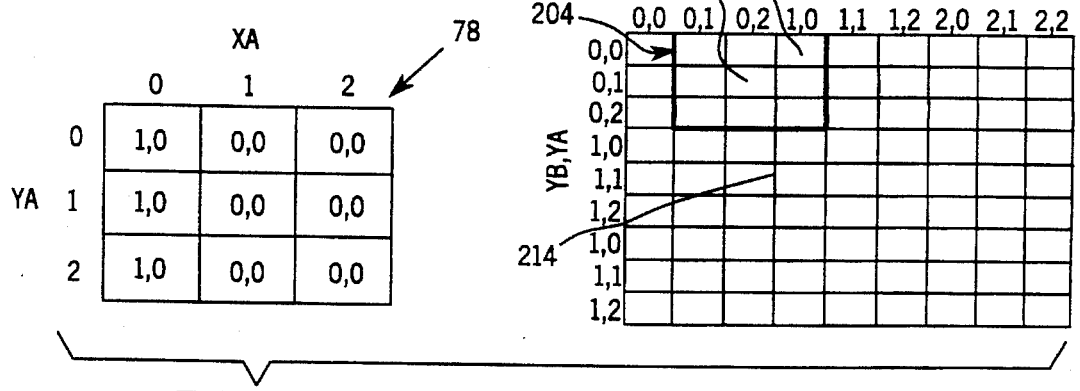
Figure 9:
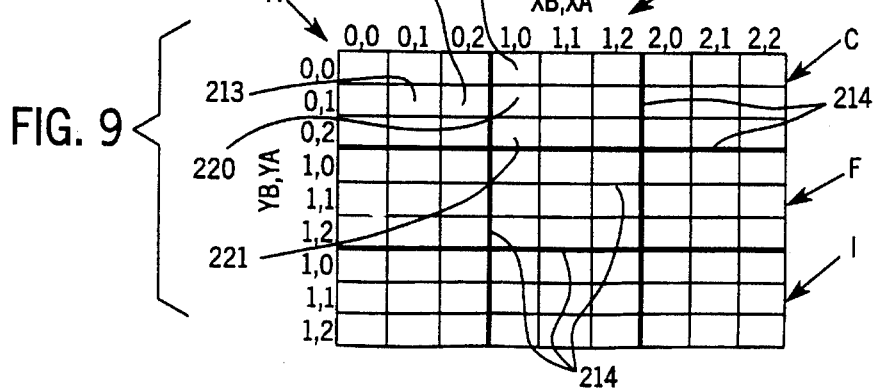
FIG. 9 is a schematic representation of the image having superimposed cache tiles illustrating the thrashing of a cache caused by calculations occurring near the boundaries.

Referring to FIG. 8, it follows generally that the entire subarray 204 may be shifted smoothly one pixel left or right simply by loading additional rows or columns into the cache which replace the previous rows or columns stored there. Thus the subarray 204 may be centered about a pixel 217 having an address of (0,2) (0,1) which straddles a tile boundary 214.

The significance of this ability to migrate the subarray smoothly over the image surface is profound. Whereas changing the tile geometry alone can provide efficiency in the caching of data in some circumstances, generally larger tile sizes create a significant risk of "thrashing", a situation where the cache is repeatably emptied and reloaded in its entirety because of data needed just outside of the cache boundary or past a tile boundary 214.

For example, referring to FIG. 10 in a fixed geometry, fixed tile boundary system, a 3×3 tile cache must be located without crossing fixed tile boundaries 214 spaced every three rows and every three columns across the image. Thus, for the example of FIG. 2, only nine different tiles of data may be cached and no others when the cache is in the 3×3 configuration. In FIG. 10, these fixed cache locations or tiles are indicated by the letters A through F lettered consecutively from left to right and from top to bottom.

In a common image processing application where an operation such as averaging may be performed on a subarray within the image, such fixed boundaries can create significant problems. Assume for example that each pixel in the image is to be replaced with the average value of it and its immediate neighbors. This operation requires 3×3 array centered on each pixel. For the pixel 213 (0,1) (0,1), the cache may be loaded with the data of tile A and the calculation readily performed. This is an example of caching working properly. When the next pixel to the right needs to be averaged however, the pixel 217 (0,1) (0,2), the data needed for the operation cross tile boundaries 214. Typically in this situation, the processor will load tile A and begin processing the across that row of data until it needs pixel 218 represented by (0,0) (1,0). This pixel 218 is no longer in tile A and so the data of tile A is "flushed" or discarded and the data of tile B is acquired. This acquisition is sufficient for that single pixel 218 but when the next row of data is accessed, the cache must again be flushed and reloaded with the data of tile A for the first two pixels 213 and 217 of the next row. The last pixel 220 of this row again is in tile B causing another flushing and reloading of the cache followed immediately by another flushing and reloading of the cache back to tile A as is necessary for the final column. One more flushing and reloading of the cache is required to get the final pixel 221 of the final row. Because each flushing and reloading of the cache requires at least nine read and write cycles, the cache here is doing very little good in speeding up the processing of the data over a simple reading of the necessary pixels directly out of memory.

Accordingly, the ability to adjust tile size must be accompanied by the ability to flexibly migrate the subarray across tile boundaries. With the present invention, if the tile A were originally loaded in the cache, only three additional reads would be required for the proposed operation centered about pixel (0,1) (0,2) those pixels basically replacing the leftmost column of the tag with data to the right of the tile boundary.

The invention being claimed is:

1. A cache memory for storing data from a source where each item of data is identified by an address having a plurality of bits, said memory comprising:

means for receiving the address and having a plurality of bit conductors divided into at least a first group and a second group;

a tag memory having an address port, and a data input and output means;

a random access memory for storing the data, and having an address port;

a multiplexer, coupled to said means for receiving the address, for selectively connecting one of the first and second groups of bit conductors to the address input ports of said tag memory and said random access memory and selectively connecting the other one of the first and second groups of bit conductors to the data input and output means of said tag memory in response to a control signal;

means for comparing a first set of bits carried by the other one of the first and second groups of bit conductors to a second set of bits read from said tag memory, and producing a signal indicative of results of that comparison; and a controller which receives the signal from said means for comparing and responds thereto by reading data from said random access memory when the signal indicates a match the first and second sets of bits, or by reading data from the source when the signal indicates that the first and second sets of bits do not match.

2. The system as recited in claim 1 wherein said controller causes the data from the source to be stored into said random access memory and causes bits carried by the other group of bit conductors to be stored into said tag memory, when the signal indicates that the first and second sets of bits do not match.

3. In an image processing system having a frame buffer that stores an image formed of a plurality of pixels in which each pixel is identified by an address having a plurality of bits, and having a pixel utilization circuit; the improvement being a cache memory for controlling the transmission of pixels from the frame buffer to the utilization circuit and comprising:

means for supplying a configuration control signal;

a tag memory having an address port, and a data input and output means;

a random access memory for storing pixels, and having an address port and a data input and output means;

means for generating addresses of pixels to be processed by the utilization circuit and applying each address to a plurality of bit conductors divided into four groups;

a multiplexer, coupled to said means for generating addresses, for selectively connecting two of the groups of bit conductors to the address ports of said tag memory and said random access memory and selectively connecting the other two groups of bit conductors to the data input and output means of said tag memory, the selective connecting being in response to said means for supplying a configuration control signal;

means for comparing a first set of bits carried by the other two bit conductor groups to a second set of bits read from said tag memory, and producing a signal indicative of results of that comparison; and a controller which receives the signal from said means for comparing by reading a pixel from said random access memory when the signal indicates a match between the first and second sets of bits, or by reading a pixel from the frame buffer when the signal indicates that the first and second sets of bits do not match.

4. The system as recited in claim 3 wherein said controller also stores the pixel from the frame buffer into said random access memory and stores bits carried by the other two group of bit conductors in said tag memory, when the signal indicates that the first and second sets of bits do not match.

5. The system as recited in claim 3 further including a set of staging latches which couple said multiplexer to the address port of said random access memory.

6. The system as recited in claim 3 wherein said further including a set of staging latches responsive to said controller for coupling said means for generating addresses of pixels to the frame buffer when the signal indicates that the first and second sets of bits do not match.

* * * * *